United States Patent
Baek et al.

(10) Patent No.: US 8,930,161 B2
(45) Date of Patent: Jan. 6, 2015

(54) APPARATUS AND METHOD FOR DIAGNOSING FAULT OF MULTI-SENSOR OF MOTOR

(75) Inventors: Jin Wook Baek, Gyunggi-do (KR); Changsung Sean Kim, Gyunggi-do (KR); Han Kyung Bae, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 502 days.

(21) Appl. No.: 13/401,374

(22) Filed: Feb. 21, 2012

(65) Prior Publication Data

US 2013/0158942 A1 Jun. 20, 2013

(30) Foreign Application Priority Data

Dec. 19, 2011 (KR) .................. 10-2011-0137458

(51) Int. Cl.
*G06F 19/00* (2011.01)
(52) U.S. Cl.
USPC ........................................... 702/145
(58) Field of Classification Search
CPC ....... G08C 17/00; H02J 7/0052; H03K 5/003; H04B 1/04
USPC ............................. 702/145, 182–185
See application file for complete search history.

(56) References Cited

U.S. PATENT DOCUMENTS

2005/0240377 A1* 10/2005 Bibelhausen et al. ........ 702/188

FOREIGN PATENT DOCUMENTS

JP 2001-312314 11/2001

* cited by examiner

*Primary Examiner* — Edward Raymond
(74) *Attorney, Agent, or Firm* — Ladas & Parry, LLP

(57) ABSTRACT

Disclosed herein are an apparatus and a method for diagnosing a fault of a multi-sensor of a motor. The apparatus includes: a plurality of tachometers attached to the motor to measure rotation speeds; and a plurality of processors each connected directly to the plurality of tachometers to receive the measured rotation speeds, thereby securing a plurality of directly obtained rotation speeds, sharing the obtained rotation speeds with each other, thereby obtaining a plurality of indirectly obtained rotation speeds, and performing a fault diagnosis on the plurality of tachometers using the plurality of directly obtained rotation speeds and the plurality of indirectly obtained rotation speeds.

15 Claims, 4 Drawing Sheets

APPARATUS AND METHOD FOR DIAGNOSING FAULT OF MULTI-SENSOR OF MOTOR

CROSS REFERENCE TO RELATED APPLICATION

This application claims the benefit of Korean Patent Application No. 10-2011-0137458, filed on Dec. 19, 2011, entitled "Apparatus and Method for Diagnosing Fault of Multi-sensor of Motor", which is hereby incorporated by reference in its entirety into this application.

BACKGROUND OF THE INVENTION

1. Technical Field

The present invention relates to an apparatus and a method for diagnosing a fault of a multi-sensor of a motor.

2. Description of the Related Art

Generally, a motor has been widely used in order to transfer power in various fields of industrial facilities. Recently, as the demand for a technology capable of accurately controlling various process facilities increases, the necessity of research into a technology for more accurately measuring a rotation speed of the motor without an error has also increased.

An apparatus for measuring a rotation speed of a motor according to the prior art calculates the rotation speed of the motor by a vector control algorithm, in the case in which a precise control is not required. The apparatus for measuring a rotation speed of a motor according to the prior art, which is a technology of measuring the rotation speed of the motor using a characteristic straight line of current and operation speed of the motor, is not appropriate to be used to a facility requiring a precise control since a measurement error of the rotation speed of the motor is large.

Therefore, in the case in which it is required to precisely measure the rotation speed, a speed of a rotor of the motor, or the like, is calculated in a state in which tachometers are additionally attached to the rotor of the motor.

In this case, a plurality of tachometers are attached to the rotor of the motor, such that even though a fault is generated in any of the attached tachometers, a rotation speed of the rotor obtained from other tachometers may be used, thereby making it possible to measure the rotation speed of the rotor while actively dealing with a situation change in various situations.

However, this fault diagnosis of the tachometer according to the prior art is individually performed for each tachometer, such that it is difficult to provide reliable fault diagnosis.

PRIOR ART DOCUMENT

Patent Document (Patent Document 1) Japanese Patent Laid-open Publication No. 2001-312314

SUMMARY OF THE INVENTION

The present invention has been made in an effort to provide an apparatus and a method for diagnosing a fault of a multi-sensor of a motor capable of accurately diagnosing and rapidly dealing with a fault, or the like, of a tachometer.

According to a preferred embodiment of the present invention, there is provided an apparatus for diagnosing a fault of a multi-sensor of a motor, the apparatus including: a plurality of tachometers attached to the motor to measure rotation speeds; and a plurality of processors each connected directly to the plurality of tachometers to receive the measured rotation speeds, thereby securing a plurality of directly obtained rotation speeds, sharing the obtained rotation speeds with each other, thereby obtaining a plurality of indirectly obtained rotation speeds, and performing a fault diagnosis on the plurality of tachometers using the plurality of directly obtained rotation speeds and the plurality of indirectly obtained rotation speeds.

When the plurality of processors receive speed instruction signals from a main controller in the case in which the plurality of processors serve as a master, the plurality of processors may output current instructions for driving the motor according to the corresponding speed instruction signals using an average value of the plurality of directly obtained rotation speeds and the plurality of indirectly obtained rotation speeds.

The apparatus may further include: a plurality of filters each corresponding to the plurality of processors and receiving the current instructions output from each processor to attenuate and output a signal component having a predetermined center frequency; and a plurality of interfaces each corresponding to the plurality of filters and controlling current of the motor according to the current instructions output from each filter.

When the plurality of directly obtained rotation speeds and the plurality of indirectly obtained rotation speeds are out of a set normal range, the plurality of processors may diagnose the plurality of directly obtained rotation speeds and the plurality of indirectly obtained rotation speeds as faults.

In the case in which rotation speeds diagnosed as the faults are present, when the plurality of processors receive speed instruction signals from a main controller in the case in which the plurality of processors serve as a master, the plurality of processors may output current instructions for driving the motor according to the corresponding speed instruction signals using an average value calculated except for the rotation speeds diagnosed as the faults among the plurality of directly obtained rotation speeds and the plurality of indirectly obtained rotation speeds.

In the case in which the rotation speeds diagnosed as the faults are present and the rotation speeds diagnosed as the faults are the directly obtained rotation speed and the indirectly obtained rotation speed obtained from the same tachometer, when the plurality of processors receive speed instruction signals from a main controller in the case in which the plurality of processors serve as a master, the plurality of processors may output current instructions for driving the motor according to the corresponding speed instruction signals using an average value calculated except for the rotation speeds of the tachometer diagnosed that the fault was generated among the plurality of directly obtained rotation speeds and the plurality of indirectly obtained rotation speeds.

In the case in which the rotation speeds diagnosed as the faults are present and the rotation speeds diagnosed as the faults are rotation speeds obtained from the same processor, the plurality of processors may diagnose that the fault was generated in the corresponding processor.

In the case in which the processor diagnosed that the fault was generated serves as a master, the processor diagnosed that the fault was generated may transfer a control right to the other processor.

According to another preferred embodiment of the present invention, there is provided a method for diagnosing a fault of a multi-sensor of a motor, the method including: (A) allowing a to plurality of processors to secure a plurality of directly obtained rotation speeds and a plurality of indirectly obtained rotation speeds; and (B) allowing the plurality of processors to perform a fault diagnosis on a plurality of tachometers using the plurality of directly obtained rotation speeds and the plurality of indirectly obtained rotation speeds.

Step (A) may include: (A-1) allowing the plurality of processors to be each connected directly to the plurality of tachometers to receive measured rotation speeds, thereby securing the plurality of directly obtained rotation speeds; and (A-2) allowing the plurality of processors to share the obtained rotation speeds with each other, thereby securing the plurality of indirectly obtained rotation speeds.

The method may further include (C), when the plurality of processors receive speed instruction signals from a main controller in the case in which the plurality of processors serve as a master, allowing the plurality of processors to output current instructions for driving the motor according to the corresponding speed instruction signals using an average value of the plurality of directly obtained rotation speeds and the plurality of indirectly obtained rotation speeds.

In step (B), when the plurality of directly obtained rotation speeds and the plurality of indirectly obtained rotation speeds are out of a set normal range, the plurality of processors may diagnose the plurality of directly obtained rotation speeds and the plurality of indirectly obtained rotation speeds as faults.

The method may further include: (D) allowing the plurality of processors to judge whether the rotation speeds diagnosed as the faults are present; and (E) allowing the plurality of processors to output current instructions for driving the motor using an average value calculated except for the rotation speeds diagnosed as the faults among the plurality of directly obtained rotation speeds and the plurality of indirectly obtained rotation speeds when the rotation speeds diagnosed as the faults are present.

The method may further include: (F) allowing the plurality of processors to judge whether rotation speeds obtained from the same tachometer are out of the normal range; and (G) allowing the plurality of processors to output current instructions for driving the motor according to the corresponding speed instruction signals using an average value calculated except for the rotation speeds of the tachometer diagnosed that the fault was generated among the plurality of directly obtained rotation speeds and the plurality of indirectly obtained rotation speeds when the tachometer diagnosed that the fault was generated is present.

The method may further include: (H) allowing the plurality of processors to judge whether rotation speeds obtained from the same processor are out of the normal range; (I) allowing the plurality of processors to diagnose that the fault was generated in the corresponding processor when the rotation speeds obtained from the same processor are out of the normal range; and (J) allowing the processor diagnosed that the fault was generated to transfer a control right to the other processor when the processor diagnosed that the fault was generated serves as a master.

DESCRIPTION OF THE PREFERRED EMBODIMENTS

Figure 1:
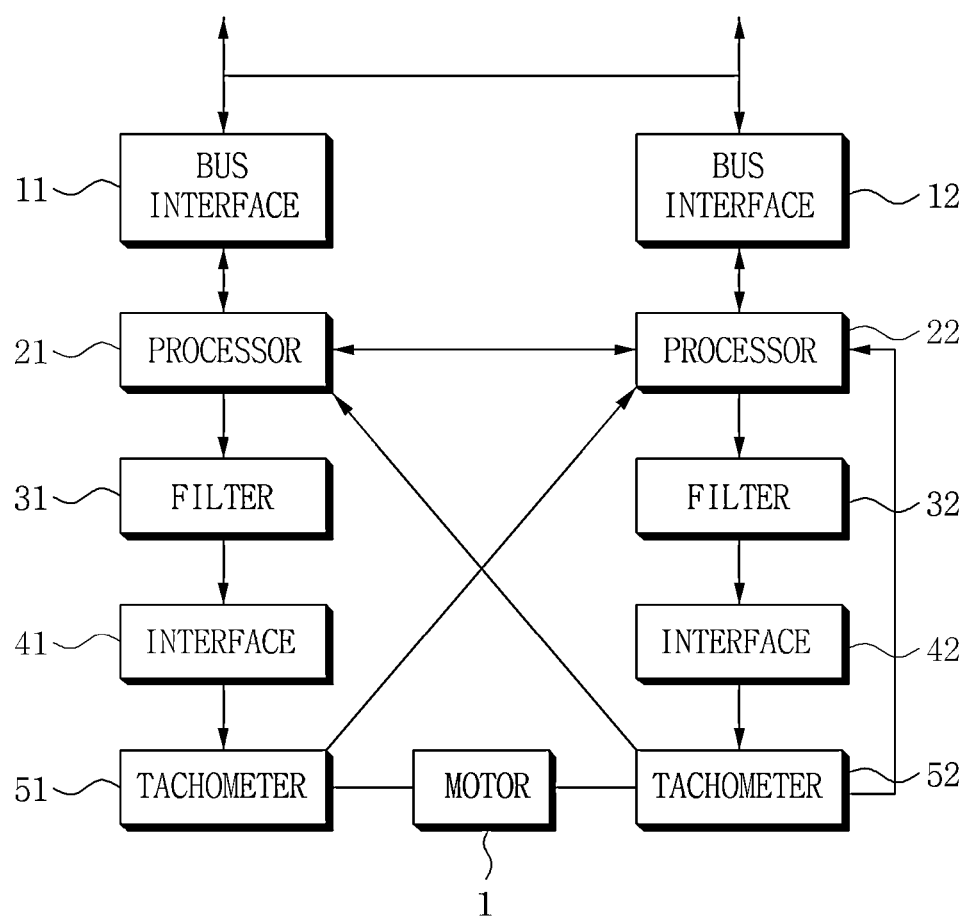
FIG. 1 is a view showing a configuration of an apparatus for diagnosing a fault of a multi-sensor of a motor according to a first preferred embodiment of the present invention.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

FIG. 1 is a view showing a configuration of an apparatus for diagnosing a fault of a multi-sensor of a motor according to a first preferred embodiment of the present invention.

Referring to FIG. 1, the apparatus for diagnosing a fault of a multi-sensor of a motor according to the first preferred embodiment of the present invention has a multiplexed structure in which it includes a pair of bus interfaces 11 and 12, a pair of processors 21 and 22, a pair of filters 31 and 32, a pair of interfaces 41 and 42, and a pair of tachometers 51 and 52.

Although FIG. 1 shows that components are provided in pair for convenience, two or more components, that is, plural components may also be implemented in the same scheme and the following description will also be similarly applied to a case in which the number of components is plural.

First, the pair of bus interfaces 11 and 12 is to provide a communication path between a main controller (not shown) of an electric vehicle, or the like, in which the motor 1 is installed and corresponding processor 21 and 22. In order to secure a number of transmission data, this bus structure is used.

In addition, any one (for example, a processor 21 (hereinafter, referred to as a master processor)) of the pair of processors 21 and 22 serves as a master to receive a speed instruction signal from a main controller and output a current instruction for driving the motor 1 according to the corresponding speed instruction signal.

In this case, the master processor 21 performs this control using a rotation speed (more specifically, a voltage value corresponding to the rotation speed) (hereinafter, since the rotation speed and the voltage value are in proportion to each other, they are used together with each other) output from the pair of tachometers 51 and 52. In order to provide a reliable control, the master processor 21 uses two rotation speeds (hereinafter, referred to as "two directly obtained rotation speeds") input directly from the pair of tachometers 51 and 52 and two rotation speeds (hereinafter, referred to as "two indirectly obtained rotation speeds") input via the other processor 22.

Meanwhile, the pair of filters 31 and 32 receives current commands output from the processors 21 and 22 to attenuate and output a signal component having a predetermined center frequency.

In addition, the pair of interfaces 41 and 42 controls current of the motor based on the current instructions, which are outputs of the filters 31 and 32, to generate a predetermined torque, thereby rotating the motor 1.

Next, the tachometers 51 and 52 are installed in the motor 1 and measure the rotation speed of the motor to simultaneously provide the measured rotation speed to the pair of processors 21 and 22.

An operation of the apparatus for diagnosing a fault of a dual-sensor of a motor having the above-mentioned configuration will be described.

First, the master processor 21 serving as a master in the pair of processors 21 and 22 receives the speed instruction signal from the main controller and outputs the current instruction for driving the motor 1 according to the corresponding speed instruction signal.

In this case, the master processor 21 uses the two directly obtained rotation speeds input directly from the pair of tachometers 51 and 52 and the two indirectly obtained rotation speeds input via the other processor 22. The master processor 21 judges whether the two directly obtained rotation speeds and the two indirectly obtained rotation speeds are in a normal range, and performs a control using an average value of the four rotation speeds when the four rotation speeds are in the normal range.

This function of the master processor 21 is also similarly applied to a case in which the number of tachometers is plural. That is, in the case in which the number of tachometers is plural, when the master processor 21 receives the speed instruction signal from the main controller, the master processor 21 performs a control using an average value of a plurality of directly obtained rotation speeds and a plurality of indirectly obtained rotation speeds obtained from the plurality of tachometers.

Here, the normal range indicates a range permitted in a previously used rotation speed. When the rotation speed is out of this normal range, it may be regarded that the rotation speed is in an error range.

Unlike this, when any one of the two directly obtained rotation speeds and the two indirectly obtained rotation speeds is out of the normal range to be in the error range, the master processor 21 ignores one rotation speed that is out of the normal range and performs a control using an average value of remaining three rotation speeds.

This function of the master processor 21 is also similarly applied to a case in which the number of tachometers is plural. That is, in the case in which the number of tachometers is plural, when the master processor 21 receives the speed instruction signal from the main controller, the master processor 21 performs a control using an average value of the rotation speeds calculated except for the rotation speed that is out of the normal range among the plurality of directly obtained rotation speeds and the plurality of indirectly obtained rotation speeds obtained from the plurality of tachometers.

Meanwhile, when any two of the two directly obtained rotation speeds and the two indirectly obtained rotation speeds are out of the normal range to be in the error range and the two rotation speeds that are out of the normal range are obtained from the same tachometer 51 or 52, the master processor 21 judges that an error was generated in the tachometer 51 or 52 from which the two rotation speeds that are out of the normal range are obtained and uses the rotation speeds obtained from the other tachometer 51 or 52.

This function of the master processor 21 is also similarly applied to a case in which the number of tachometers is plural. That is, in the case in which the number of tachometers is plural, when the master processor 21 receives the speed instruction signal from the main controller, the master processor 21 performs a control using an average value of the rotation speeds calculated except for the rotation speed of the tachometer that is out of the normal range among the plurality of directly obtained rotation speeds and the plurality of indirectly obtained rotation speeds obtained from the plurality of tachometers.

In addition, when any two of the two directly obtained rotation speeds and the two indirectly obtained rotation speeds are out of the normal range to be in the error range and the two rotation speeds that are out of the normal range are obtained from the same processor 21 or 22, the master processor 21 judges that an error was generated in the processor 21 or 22 from which the two rotation speeds that are out of the normal range are obtained and transfers a control right to the other processor 22, that is, a slave processor 22 to allow a control state to be maintained when it is judged that the processor in which the error is generated was the master processor 21.

This function of the master processor 21 is also similarly applied to a case in which the number of tachometers is plural. That is, in the case in which the number of tachometers is plural, when the rotation speeds that are out of the normal range are rotation speeds obtained from the same processors, the master processor 21 diagnoses that a fault was generated in the corresponding processor.

Further, when all or three of the two directly obtained rotation speeds and the two indirectly obtained rotation speeds are out of the normal range, the master processor 21 judges that a fault was generated in both of the pair of tachometers 51 and 52 to inform an operator that the fault was generated, thereby making it possible to allow the operator to replace the tachometers 51 and 52.

As described above, when the plurality of directly obtained rotation speeds and the plurality of indirectly obtained rotation speeds are used, the fault of the processor 21 or 22 as well as the fault of the tachometer 51 or 52 may be diagnosed. Furthermore, in the case in which an error is generated, such as the case in which noise is applied to any one of the plurality of rotation speeds, the corresponding rotation speed is detected and removed, thereby making it possible to perform a reliable control.

Figure 2:
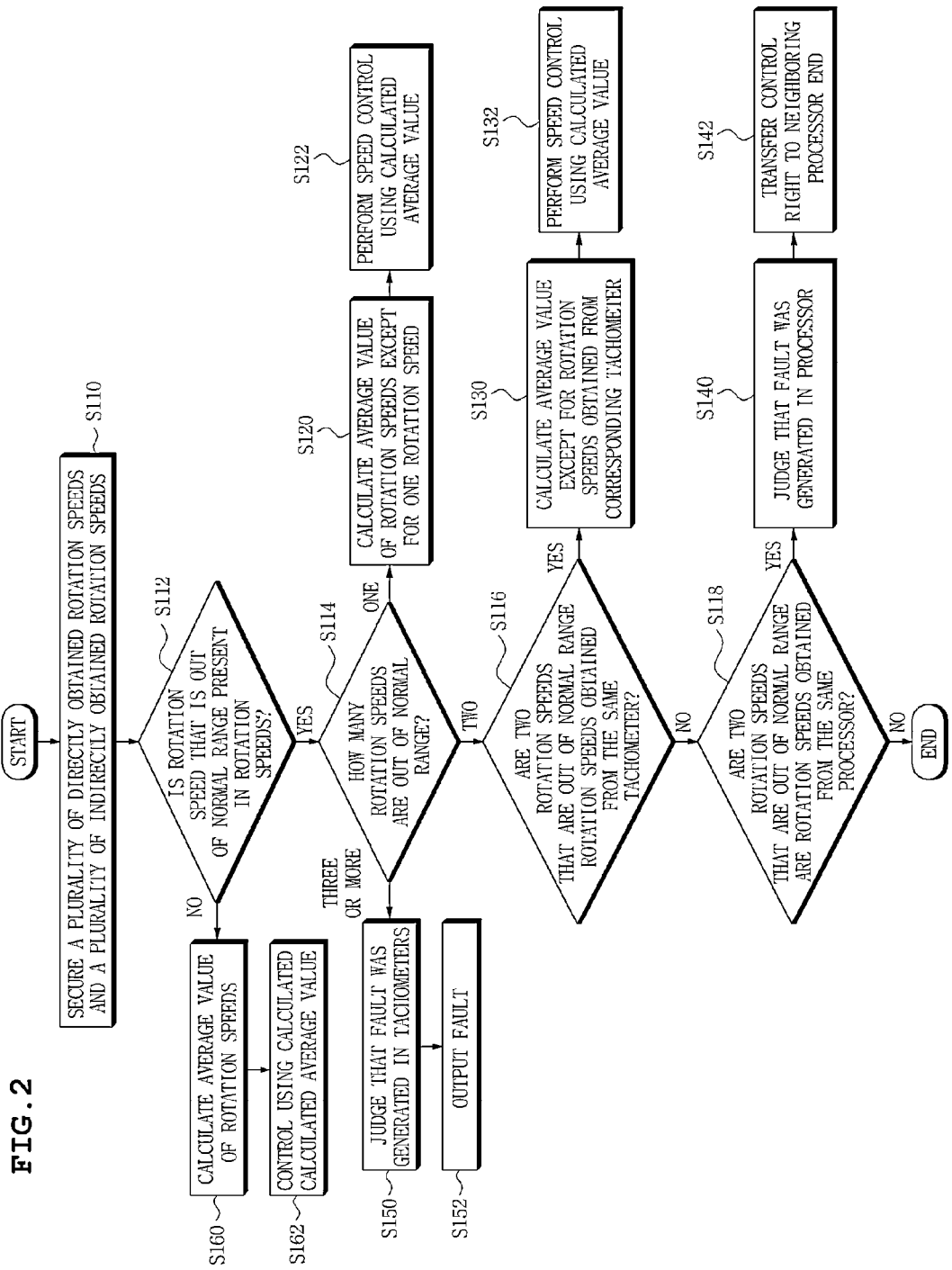
FIG. 2 is a flow chart of a method for diagnosing a fault of a multi-sensor of a motor according to the first preferred embodiment of the present invention.

FIG. 2 is a flow chart of a method for diagnosing a fault of a multi-sensor of a motor according to the first preferred embodiment of the present invention.

Referring to FIG. 2, in the method for diagnosing a fault of a multi-sensor of a motor according to the first preferred embodiment of the present invention, a master processor first secures a plurality of directly obtained rotation speeds and a plurality of indirectly obtained rotation speeds (S110).

Here, the master processor is connected directly to a tachometer to receive the directly obtained rotation speeds. In addition, the master processor is connected to a tachometer via a neighboring slave processor to receive and secure the indirectly obtained rotation speeds.

Next, the master processor judges whether rotation speeds that are out of a normal range are present in the secured rotation speeds (S112), calculates an average value of the rotation speeds when it is judged that the plurality of rotation speeds are in the normal range as a judgment result (S160), and performs a speed control of the motor using the calculated average value of the rotation speeds (S162).

Figure 3:
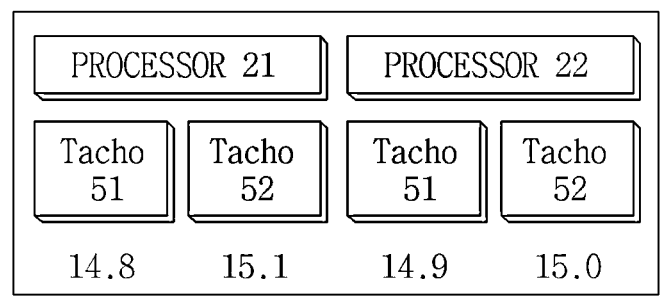
FIG. 3 is a view showing a case in which all of rotation speeds used in the present invention are in a normal range.

An example thereof is shown in FIG. 3. In FIG. 3, a voltage value corresponding to a rotation speed transmitted from a tachometer denoted by a reference numeral 51 to a processor denoted by a reference numeral 21 is 14.8 V, a voltage value corresponding to a rotation speed transmitted from a tachometer denoted by a reference numeral 52 to the processor denoted by the reference numeral 21 is 15.1 V, a voltage value corresponding to a rotation speed transmitted from the tachometer denoted by the reference numeral 51 to a processor denoted by a reference numeral 22 is 14.9 V, and a voltage value corresponding to a rotation speed transmitted from the tachometer denoted by the reference numeral 52 to the processor denoted by the reference numeral 22 is 15.0 V.

Here, when a previous average value is 15 V and a normal range is 0.5 V, all of the four rotation speeds are in the normal range.

Therefore, the master processor calculates an average value (14.95 V) of the four rotation speeds and performs a speed control of the motor using the calculated average value of the rotation speeds.

Meanwhile, when it is judged that the rotation speeds that are out of the normal range are present among the secured rotation speeds as the judgment result, the master processor performs different processes according to the number, a kind, or the like, of rotation speeds that are out of the normal range.

As an example, when it is judged that one rotation speed is out of the normal range (S114), the master processor calculates an average value of remaining rotation speeds except for one rotation speed that is out of the normal range (S120), and performs a speed control of the motor using the calculated average value of the rotation speeds (S122).

Figure 4:
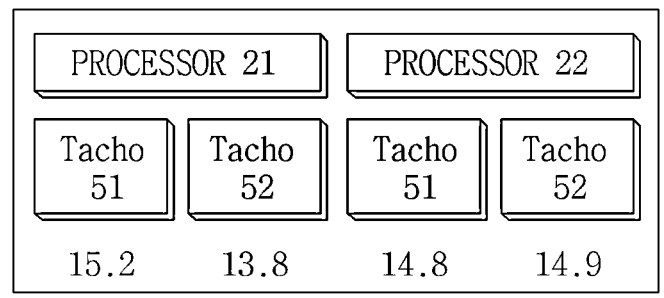
FIG. 4 is a view showing a case in which any one of the rotation speeds used in the present invention is out of the normal range.

An example thereof is shown in FIG. 4. In FIG. 4, a voltage value corresponding to a rotation speed transmitted from the tachometer denoted by the reference numeral 51 to the processor denoted by the reference numeral 21 is 15.2 V, a voltage value corresponding to a rotation speed transmitted from the tachometer denoted by the reference numeral 52 to the processor denoted by the reference numeral 21 is 13.8 V, a voltage value corresponding to a rotation speed transmitted from the tachometer denoted by the reference numeral 51 to the processor denoted by the reference numeral 22 is 14.8 V, and a voltage value corresponding to a rotation speed transmitted from the tachometer denoted by the reference numeral 52 to the processor denoted by the reference numeral 22 is 14.9 V.

Here, when a previous average value is 15 V and a normal range is 0.5 V, 13.8 V among voltage values corresponding to the four rotation speeds is out of the normal range.

Therefore, the master processor 21 calculates an average value (14.85 V) of three rotation speeds except for 13.8 V and performs a speed control of the motor using the calculated average value of the rotation speeds.

Figure 5:
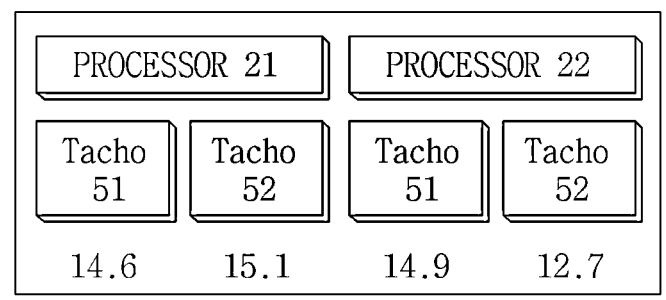
FIG. 5 is a view showing another example of a case in which any one of the rotation speeds used in the present invention is out of the normal range.

Another example is shown in FIG. 5. In FIG. 5, a voltage value corresponding to a rotation speed transmitted from the tachometer denoted by the reference numeral 51 to the processor denoted by the reference numeral 21 is 14.6 V, a voltage value corresponding to a rotation speed transmitted from the tachometer denoted by the reference numeral 52 to the processor denoted by the reference numeral 21 is 15.1 V, a voltage value corresponding to a rotation speed transmitted from the tachometer denoted by the reference numeral 51 to the processor denoted by the reference numeral 22 is 14.9 V, and a voltage value corresponding to a rotation speed transmitted from the tachometer denoted by the reference numeral 52 to the processor denoted by the reference numeral 22 is 12.7 V.

Here, when a previous average value is 15 V and a normal range is 0.5 V, 12.7 V among voltage values corresponding to the four rotation speeds is out of the normal range.

Therefore, the master processor calculates an average value (14.85 V) of three rotation speeds except for 12.7 V and performs a speed control of the motor using the calculated average value of the rotation speeds.

This example shows that when it is judged that the plurality of rotation speed are out of the normal range, the master processor may calculate an average value of remaining rotation speeds except for the rotation speeds that are out of the normal range and perform a speed control of the motor using the calculated average value of the rotation speeds. That is, the master processor may calculate the average value except for the rotation speed that is out of the normal range without judging whether the rotation speed that is out of the normal range is a rotation speed obtained from the same tachometer or a rotation speed obtained from the other processor and use the calculated average value to perform the control.

Next, when it is judged that two rotation speeds are out of the normal range, the master processor judges whether the two rotation speeds that are out of the normal range are rotation speeds obtained from the same tachometer (S116), calculates an average value of rotation speeds obtained from the other tachometer except for the rotation speeds obtained from the corresponding tachometer when the two rotation speeds that are out of the normal range are rotation speeds obtained from the same tachometer (S130), and performs a speed control of the motor using the calculated average value of the rotation speeds (S132).

Figure 6:
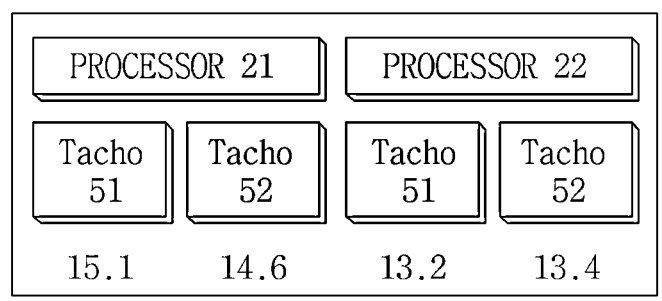
FIG. 6 is a view showing another example of a case in which two rotation speeds obtained from the same tachometer among the rotation speeds used in the present invention are out of the normal range.

An example thereof is shown in FIG. 6. In FIG. 6, a voltage value corresponding to a rotation speed transmitted from the tachometer denoted by the reference numeral 51 to the processor denoted by the reference numeral 21 is 14.2 V, a voltage value corresponding to a rotation speed transmitted from the tachometer denoted by the reference numeral 52 to the processor denoted by the reference numeral 21 is 16.2 V, a voltage value corresponding to a rotation speed transmitted from the tachometer denoted by the reference numeral 51 to the processor denoted by the reference numeral 22 is 14.3 V, and a voltage value corresponding to a rotation speed transmitted from the tachometer denoted by the reference numeral 52 to the processor denoted by the reference numeral 22 is 16.1 V.

Here, when a previous average value is 15 V and a normal range is 0.5 V, 16.2 V and 16.1 V among voltage values corresponding to the four rotation speeds are out of the normal range and are rotation speeds obtained from the tachometer denoted by the reference numeral 52.

Therefore, the master processor calculates an average value (14.25 V) of rotation speeds obtained from the tachometer denoted by the reference numeral 51 except for the rotation speeds obtained from the tachometer denoted by the reference numeral 52 and performs a speed control of the motor using the calculated average value of the rotation speeds.

This example shows that when it is judged that the plurality of rotation speed are out of the normal range and a rotation speed output from the same tachometer as the tachometer outputting the rotation speeds that are out of the normal range is present, the master processor may calculate an average value of remaining rotation speeds except for the rotation speeds output from the corresponding tachometer and perform a speed control of the motor using the calculated average value of the rotation speeds.

Meanwhile, when it is judged that two rotation speeds are out of the normal range, the master processor 21 judges whether the two rotation speeds that are out of the normal range are rotation speeds obtained from the same processor (S118), judges that a fault was generated in the processor when the two rotation speeds that are out of the normal range are rotation speeds obtained from the same processor (S140), and transfers a control right to a neighboring processor to allow a speed control to be continuously performed when it is judged that the processor in which the fault is generated was the master processor (S142).

Figure 7:
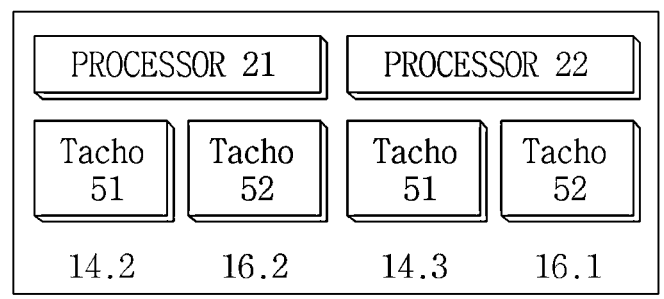
FIG. 7 is a view showing another example of a case in which two rotation speeds obtained from the same processor among the rotation speeds used in the present invention are out of the normal range.

An example thereof is shown in FIG. 7. In FIG. 7, a voltage value corresponding to a rotation speed transmitted from the tachometer denoted by the reference numeral 51 to the processor denoted by the reference numeral 21 is 15.1 V, a voltage value corresponding to a rotation speed transmitted from the tachometer denoted by the reference numeral 52 to the processor denoted by the reference numeral 21 is 14.6 V, a voltage value corresponding to a rotation speed transmitted from the tachometer denoted by the reference numeral 51 to the processor denoted by the reference numeral 22 is 13.2 V, and a voltage value corresponding to a rotation speed transmitted from the tachometer denoted by the reference numeral 52 to the processor denoted by the reference numeral 22 is 13.4 V.

Here, when a previous average value is 15 V and a normal range is 0.5 V, 13.2 V and 13.4 V among voltage values corresponding to the four rotation speeds are out of the normal range and are rotation speeds that the processor denoted by the reference numeral 22 obtains from the tachometer.

Therefore, the master processor judges that the fault was generated in the processor denoted by the reference numeral 22. In this case, since a processor in which the fault is generated is not the master processor, an operation of transferring the control right is not required.

This example shows that when it is judged that the plurality of rotation speeds are out of the normal range and the rotation speeds that are out of the normal range are the rotation speeds obtained from the same processor, the master processor may judge that the fault was generated in the corresponding processor.

Next, when all or three of the two directly obtained rotation speeds and the two indirectly obtained rotation speeds are out of the normal range, the master processor judges that the fault was generated in both of the pair of tachometers 51 and 52 (S150) to inform an operator that the fault was generated, thereby making it possible to allow the operator to replace the tachometers 51 and 52 (S152).

As described above, when the plurality of directly obtained rotation speeds and the plurality of indirectly obtained rotation speeds are used, the fault of the processor as well as the fault of the tachometer may be diagnosed. Furthermore, in the case in which noise is applied to any one of the plurality of rotation speeds, the corresponding rotation speed is detected and removed, thereby making it possible to perform a reliable control.

As set forth above, according to the preferred embodiments of the present invention, it is possible to accurately diagnose and rapidly deal with the fault, or the like, of the tachometer.

That is, according to the preferred embodiments of the present invention, the fault is diagnosed using the rotation speed obtained directly from the tachometer and the rotation speed obtained via a neighboring processor in a multiplexed structure, such that the fault may be more accurately and reliably diagnosed.

Therefore, it is possible to improve reliability of the motor used in an electric vehicle, or the like.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. An apparatus for diagnosing a fault of a multi-sensor of a motor, the apparatus comprising:
    a plurality of tachometers attached to the motor to measure rotation speeds; and
    a plurality of processors each connected directly to the plurality of tachometers to receive the measured rotation speeds, thereby securing a plurality of directly obtained rotation speeds, sharing the obtained rotation speeds with each other, thereby obtaining a plurality of indirectly obtained rotation speeds, and performing a fault diagnosis on the plurality of tachometers using the plurality of directly obtained rotation speeds and the plurality of indirectly obtained rotation speeds.

2. The apparatus as set forth in claim 1, wherein when the plurality of processors receive speed instruction signals from a main controller in the case in which the plurality of processors serve as a master, the plurality of processors output current instructions for driving the motor according to the corresponding speed instruction signals using an average value of the plurality of directly obtained rotation speeds and the plurality of indirectly obtained rotation speeds.

3. The apparatus as set forth in claim 2, further comprising:
    a plurality of filters each corresponding to the plurality of processors and receiving the current instructions output from each processor to attenuate and output a signal component having a predetermined center frequency; and
    a plurality of interfaces each corresponding to the plurality of filters and controlling current of the motor according to the current instructions output from each filter.

4. The apparatus as set forth in claim 1, wherein when the plurality of directly obtained rotation speeds and the plurality of indirectly obtained rotation speeds are out of a set normal range, the plurality of processors diagnose the plurality of directly obtained rotation speeds and the plurality of indirectly obtained rotation speeds as faults.

5. The apparatus as set forth in claim 4, wherein in the case in which rotation speeds diagnosed as the faults are present, when the plurality of processors receive speed instruction signals from a main controller in the case in which the plurality of processors serve as a master, the plurality of processors output current instructions for driving the motor according to the corresponding speed instruction signals using an average value calculated except for the rotation speeds diagnosed as the faults among the plurality of directly obtained rotation speeds and the plurality of indirectly obtained rotation speeds.

6. The apparatus as set forth in claim 4, wherein in the case in which the rotation speeds diagnosed as the faults are present and the rotation speeds diagnosed as the faults are the directly obtained rotation speed and the indirectly obtained rotation speed obtained from the same tachometer, when the plurality of processors receive speed instruction signals from a main controller in the case in which the plurality of processors serve as a master, the plurality of processors output current instructions for driving the motor according to the corresponding speed instruction signals using an average value calculated except for the rotation speeds of the tachometer diagnosed that the fault was generated among the plurality of directly obtained rotation speeds and the plurality of indirectly obtained rotation speeds.

7. The apparatus as set forth in claim 4, wherein in the case in which the rotation speeds diagnosed as the faults are present and the rotation speeds diagnosed as the faults are rotation speeds obtained from the same processor, the plurality of processors diagnose that the fault was generated in the corresponding processor.

8. The apparatus as set forth in claim 7, wherein in the case in which the processor diagnosed that the fault was generated serves as a master, the processor diagnosed that the fault was generated transfers a control right to the other processor.

9. A method for diagnosing a fault of a multi-sensor of a motor, the method comprising:
   (A) allowing a plurality of processors to secure a plurality of directly obtained rotation speeds and a plurality of indirectly obtained rotation speeds; and
   (B) allowing the plurality of processors to perform a fault diagnosis on a plurality of tachometers using the plurality of directly obtained rotation speeds and the plurality of indirectly obtained rotation speeds.

10. The method as set forth in claim 9, wherein step (A) includes:
   (A-1) allowing the plurality of processors to be each connected directly to the plurality of tachometers to receive measured rotation speeds, thereby securing the plurality of directly obtained rotation speeds; and
   (A-2) allowing the plurality of processors to share the obtained rotation speeds with each other, thereby securing the plurality of indirectly obtained rotation speeds.

11. The method as set forth in claim 9, further comprising (C), when the plurality of processors receive speed instruction signals from a main controller in the case in which the plurality of processors serve as a master, allowing the plurality of processors to output current instructions for driving the motor according to the corresponding speed instruction signals using an average value of the plurality of directly obtained rotation speeds and the plurality of indirectly obtained rotation speeds.

12. The method as set forth in claim 9, wherein in step (B), when the plurality of directly obtained rotation speeds and the plurality of indirectly obtained rotation speeds are out of a set normal range, the plurality of processors diagnose the plurality of directly obtained rotation speeds and the plurality of indirectly obtained rotation speeds as faults.

13. The method as set forth in claim 12, further comprising:
   (D) allowing the plurality of processors to judge whether the rotation speeds diagnosed as the faults are present; and
   (E) allowing the plurality of processors to output current instructions for driving the motor using an average value calculated except for the rotation speeds diagnosed as the faults among the plurality of directly obtained rotation speeds and the plurality of indirectly obtained rotation speeds when the rotation speeds diagnosed as the faults are present.

14. The method as set forth in claim 12, further comprising:
   (F) allowing the plurality of processors to judge whether rotation speeds obtained from the same tachometer are out of the normal range; and
   (G) allowing the plurality of processors to output current instructions for driving the motor according to the corresponding speed instruction signals using an average value calculated except for the rotation speeds of the tachometer diagnosed that the fault was generated among the plurality of directly obtained rotation speeds and the plurality of indirectly obtained rotation speeds when the tachometer diagnosed that the fault was generated is present.

15. The method as set forth in claim 12, further comprising:
   (H) allowing the plurality of processors to judge whether rotation speeds obtained from the same processor are out of the normal range;
   (I) allowing the plurality of processors to diagnose that the fault was generated in the corresponding processor when the rotation speeds obtained from the same processor are out of the normal range; and
   (J) allowing the processor diagnosed that the fault was generated to transfer a control right to the other processor when the processor diagnosed that the fault was generated serves as a master.

* * * * *